United States Patent
Re et al.

(10) Patent No.: US 7,133,917 B2
(45) Date of Patent: Nov. 7, 2006

(54) SYSTEM AND METHOD FOR DISTRIBUTION OF SOFTWARE LICENSES IN A NETWORKED COMPUTING ENVIRONMENT

(75) Inventors: Vincent Re, St. James, NY (US); Vincent Scovetta, Ronkonkoma, NY (US); George Lutz, Commack, NY (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 10/862,590

(22) Filed: Jun. 7, 2004

(65) Prior Publication Data

US 2004/0260765 A1    Dec. 23, 2004

Related U.S. Application Data

(60) Provisional application No. 60/476,428, filed on Jun. 6, 2003.

(51) Int. Cl.
*G06F 13/00* (2006.01)
(52) U.S. Cl. .................. 709/224; 709/217; 713/201
(58) Field of Classification Search ............... 709/203, 709/217, 219, 223, 224, 226; 713/201
See application file for complete search history.

(56) References Cited

U.S. PATENT DOCUMENTS

| | | | | |
|---|---|---|---|---|
| 5,579,222 A * | 11/1996 | Bains et al. | ................. | 717/167 |
| 5,658,552 A * | 8/1997 | Bunning et al. | ............... | 424/45 |
| 6,101,606 A * | 8/2000 | Diersch et al. | ............. | 713/201 |
| 6,233,567 B1 * | 5/2001 | Cohen | ......................... | 705/59 |
| 6,510,466 B1 * | 1/2003 | Cox et al. | .................... | 709/229 |
| 2002/0065780 A1 * | 5/2002 | Barritz et al. | ................. | 705/59 |
| 2002/0138764 A1 * | 9/2002 | Jacobs et al. | ............... | 713/201 |
| 2002/0161718 A1 * | 10/2002 | Coley et al. | ................. | 705/59 |
| 2003/0028395 A1 * | 2/2003 | Rodgers et al. | ................. | 705/1 |
| 2003/0088516 A1 * | 5/2003 | Remer et al. | ................. | 705/59 |
| 2004/0010471 A1 * | 1/2004 | Lenard et al. | ................ | 705/59 |

* cited by examiner

*Primary Examiner*—Viet D. Vu
(74) *Attorney, Agent, or Firm*—Baker Botts L.L.P.

(57) ABSTRACT

A system and method of distributing software licenses in a networked computing environment is provided. The system and method in one aspect comprise a management application and a plurality of agents. The plurality of agents each reside on computers in a network, for example, remote from the management application. The management application includes a user interface from which information about the plurality of computers in a network may be obtained via the plurality of agents and license information may be distributed to the plurality of computers.

20 Claims, 4 Drawing Sheets

SYSTEM AND METHOD FOR DISTRIBUTION OF SOFTWARE LICENSES IN A NETWORKED COMPUTING ENVIRONMENT

CROSS-REFERENCE TO RELATED APPLICATIONS

This application claims the benefit of U.S. Provisional Patent Application No. 60/476,428 entitled SYSTEM AND METHOD FOR DISTRIBUTION OF SOFTWARE LICENSES IN A NETWORKED COMPUTING ENVIRONMENT filed on Jun. 6, 2003, the entire disclosure of which is incorporated herein by reference.

TECHNICAL FIELD

This application relates to managing software licenses in a computing environment.

BACKGROUND

Commercial software products frequently require some type of digital license "key" that enables the use of the product under certain conditions. The key itself is an arbitrary digital artifact that broadly reflects the terms and conditions under which a given customer may legitimately use the accompanying product. The actual policy represented by the license varies, but commonly may include items such as: specific identification of the computers where the software is eligible for execution, such as network host name or address, an internal serial number such as that used by network hardware (the so-called MAC address), a CPU serial number or hard disk serial number or combinations of all of the above; restrictions on use of the software, such as the maximum number of users that can be accommodated, expiration dates and so on; identification of the customer or user of the software; other policy items, for instance, whether the software can be executed on other computers of the same type, or only on the named computer; digital signatures and other data as needed to protect licenses from alteration.

In large computer networks, maintaining these licenses across the computer's lifecycle can be a difficult and error prone manual process. Licenses must be requested from the vendor, installed on the correct computers and monitored for errors such as impending license expiration. At large scale, thousands or tens of thousands of computer, the management problems associated with administering software licenses escalate enormously due to the workload and degree of manual effort required. Accordingly, an improved way to manage licenses is desirable that address many of these shortcomings.

SUMMARY

A system and method of distributing software licenses in a networked computing environment is provided. The system in one embodiment includes a plurality of agents residing on a computer in a network. Each of the plurality of agents is operable to gather configuration information about a respective computer on which the agent resides and one or more products installed on the respective computer. A management application is operable to communicate with the plurality of agents and receive the configuration information. The management application may be further operable to communicate with a vendor computer of the one or more products to request a license from the vendor, and provide the license to the plurality of agents. The plurality of agents are operable to update license information received from the management application in their respective computers where they are resident.

The method, in one embodiment, includes providing one or more agents to be installed on one or more respective computers in a network. The one or more agents, in one aspect, retrieve and communicate configuration information about the respective computers and one or more products installed on the respective computers. The method includes providing a management application to be installed remotely from at least one of the plurality of agents. The management application administers license distribution for one or more products installed on the computers where the plurality of agents reside by communicating information from and to the plurality of agents.

Further features as well as the structure and operation of various embodiments are described in detail below with reference to the accompanying drawings. In the drawings, like reference numbers indicate identical or functionally similar elements.

DETAILED DESCRIPTION

The system and method of the present disclosure in one embodiment automates the software license management lifecycle, saving the user from having to administer the user's software licenses manually, for example, in complex networks comprising large numbers of servers.

In one embodiment, the system and method of the present disclosure allow a user or a customer to automatically discover or manually define software configurations of arbitrarily complex computer networks. The system and method of the present disclosure also allow a user or a customer to visualize, report and monitor the software configuration of any number of networked computers. Further a user or a customer may define and submit software license changes to the vendor as requirements dictate. The system and method of the present disclosure also automatically populate updated software licenses to the specific computers where they are needed.

Figure 1:
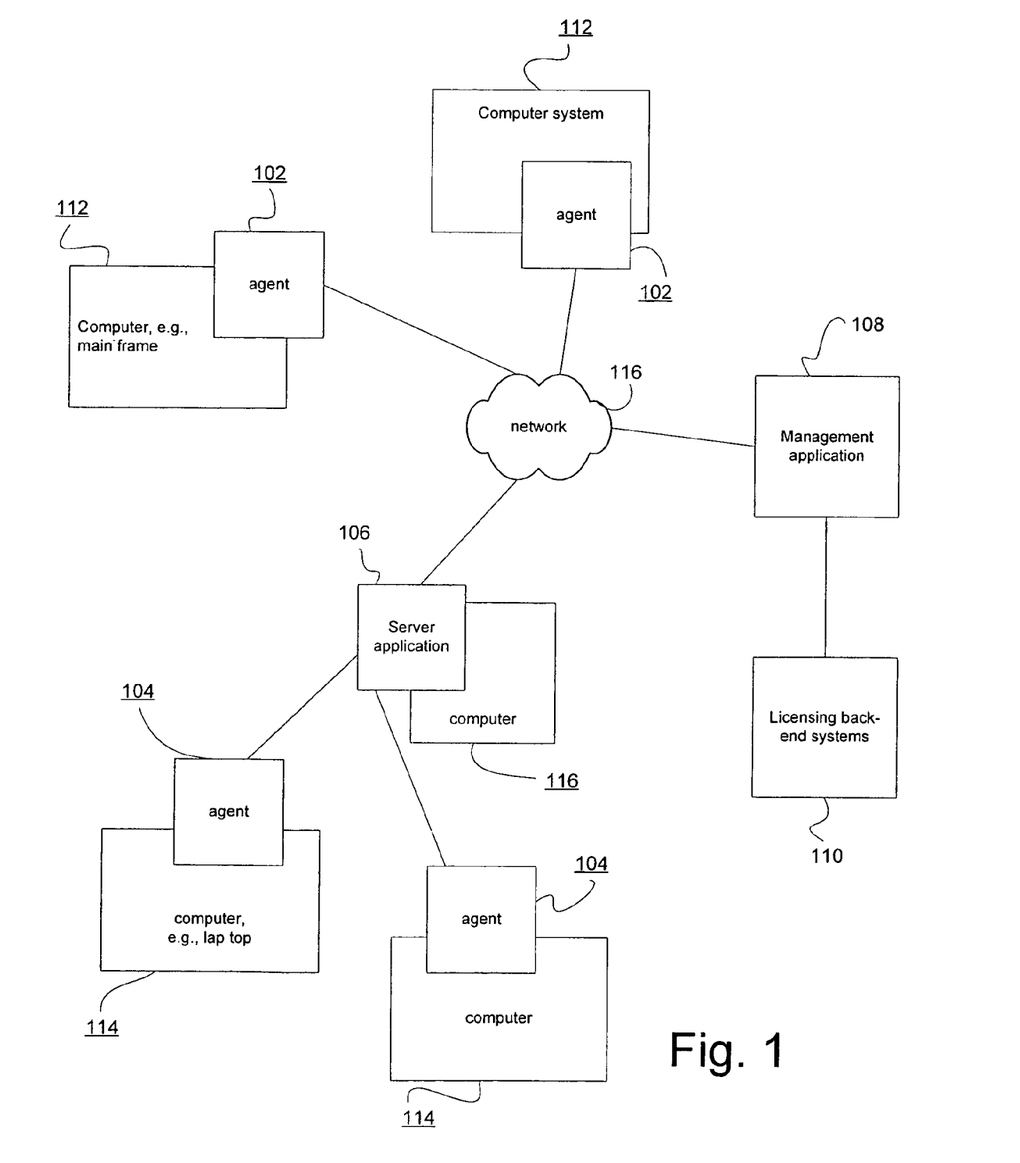
FIG. 1 is an architectural diagram illustrating the components of the system of the present disclosure in one embodiment.

FIG. 1 is an architectural diagram illustrating the components of the system of the present disclosure in one embodiment. Agents 102 104 integrate with the licensing system and communicate configuration and status information with a central server. There may be different types of agents based on the platform and type of licensing system being used. An optional server application 106 consolidates the raw information collected by one or more agents 104. For example, the server application 106 acts as a "proxy" to collect and report licensing information for a dependent set of computers 114. A management application 108 displays the customer's configuration, enables the user to request changes and orchestrates license delivery back to the proper servers or computers needing licenses. Networking software communicates licenses and status information across the customer's network. Back-end software 110 running on a company's (vendor's) computers processes requests and generates the required licenses.

In one embodiment, one type of an agent referred to as a LMP license management agent 102 handles data gathering and distribution of LMP product information and licenses. LMP, for example, is a licensing mechanism found on IBM mainframe computers running MVS, OS/390 or the z/OS operating systems. In one embodiment, there is one instance of the license management application on each monitored operating system image.

The LMP license management agent 102 may include communication and management functions that allow requests to be scheduled by the management application 108 over a TCP/IP network connection. Multiple requests are handled and coordinated using operating system multithreading, so that multiple requests can be in various stages of execution on a given system at once.

The LMP license management agent 102 may also provide user authentication. Since much of the underlying data accessed by the LMP agent 102 may be privileged, explicit user authentication is provided. The caller or a process that communicates with the LMP agent 102 presents credentials which are validated by the underlying security engine, and the users determined to be legitimate may request other functions.

The LMP license management agent 102 also gathers license and configuration data. This capability returns information from the configuration of the computer, including, for example, operating system and hardware configuration, and the status of any LMP licensed products on the platform 112. Configuration data may include machine type, MIPS capacity of the underlying hardware, operating system name and release. LMP status information may include a list of all installed products, and also may include both properly licensed products and products where a violation condition may exist. Configuration data is extracted, for example, from operating system data structures and by using well-defined hardware interfaces. Product status information is extracted from memory resident data structures maintained by the base LMP licensing system.

The LMP licensing management agent 102 also may handle distribution of LMP licenses. As new licenses are requested by the client, the LMP agent 102 non-disruptively installs and activates them by updating entries in the LMP license key file. A subsequent restart of the CAIRIM utility activates the new licenses so that they can be used without requiring any type of outage. The client or customer can also request that new licenses are not activated until the next restart of the underlying system, if needed to coordinate complex changes with an external event. The LMP agent 102 communicates among the agents and the license management system via TCP/IP, and proper user credentials are used to access a particular system.

In one embodiment, the system and method of the present disclosure may include another type of an agent model that follows a license management agent and a server approach. For example, an ALP license management agent 104 and server 106 function similarly to the LMP license management agent 102 and handle the data gathering and license distribution for ALP based products. ALP is another licensing mechanism found on Windows™, Linux™, UNIX™ and other non-mainframe computers. In one embodiment, there is one instance of the license management application on each monitored operating system image.

In this agent and server approach, the systems are designated as agents or servers. Agent-designated systems are responsible for maintaining information for their own computers, while server-designated systems may also be responsible for additional computers. The agent 104, together with the appropriate servers 106 and management application 108, allows customers to install new licenses from a central location, distribute license updates across large number of target computers, and gather license usage and system configuration data.

The agent 104 reads and updates license ("OLF") files on remote computers. This capability is used to automatically distribute new or updated licenses from a single central site to any number of distributed systems. This approach permits a staged, "fan-out" of licenses from a central location to a small number of servers, and then on to individual computers. This is useful where end-user computers are not expected to be continuously and reliably connected to the network. Thus, the system and method of the present disclosure supports these "casually connected" computers.

The agent 104 may also read and updates license reporting audit trails. In one embodiment, license management is distinguished between products available for use, versus those that actually are being used. In some configurations, clients have licenses in place, but may not actually be using the products, or they may have products that they are using without having the prerequisite licenses. The information retained by the underlying licensing system's audit trail serves as a way to make this distinction.

The agent 104 may also retrieve configuration information, such as the computer model, operating system, version of the licensing system, and other information. This information is used by the license management system to "discover" the configuration of a remote systems without the user needing to manually enter the details.

For communications ALP agents 104 in one embodiment employ a three-tier model. Requests generally originate with the license management application 108, although there may be requests between instances of agents 102 104 in some cases. Most requests are directed to a license server 106 process. The license server 106 process has the ability to authoritatively satisfy many requests without needing to go to the target machines 114 such as a portable laptop computer, which may not be available, for instance, because the laptop computer is not connected to the network, at the time a licensing change is requested.

When needed, agent 104 and server 116 may use a push/pull synchronization protocol to coordinate with one another. This approach allows the type of "casually connected" network where individual computers are not necessarily accessible at all times.

The License Management Application 108, in one embodiment, is a graphical application that allows the end user to visualize, monitor and alter licensed software anywhere in the customer's networked environment. The license management application 108 manages configuration information. This capability allows any number of agent systems 102 104 106 to be detected and managed by the management application 108. Agents can be manually defined, for instance, in anticipation of a new computer system before it is actually delivered and installed, or dynamically detected.

Figure 2:
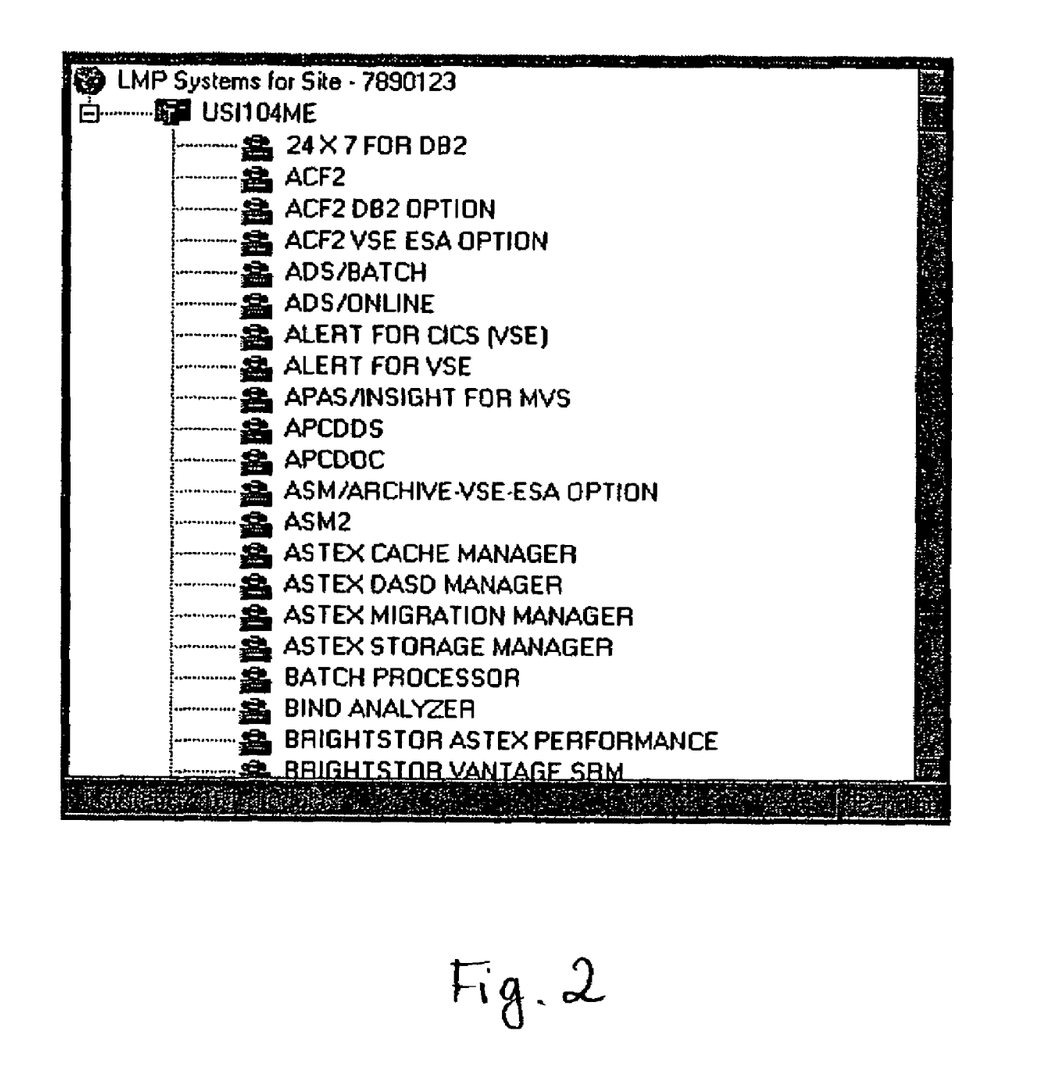
FIG. 2 is a display of agent information in one embodiment.

In both cases, for each system it is managing, the management application 108 tracks configuration details such as type of computer, operating system/name/release and any hardware identifiers that may be needed when generating keys for that system; networking information such as host name and network address, for ALP agents 104, proxy and server 106 information that can be used to communicate with the agent 104; configuration information such as the list of installed products; status information on each product in use such as license in force, error, about to expire; security information such as user credentials needed on each system; inventory of license keys available for a particular computer; software configuration information, which may include (but not limited to) version information for the licensing system and its agents. A typical display of LMP agent information is shown in FIG. 2.

The license management application 108 also handles registration functions. These functions allow the administrator to register new computers with the system, either manually or automatically. Automatic discovery uses information preconfigured into the network's DNS (Domain Name Service) to locate any configured servers. Selected servers can then be subsequently polled and queried for information about any agents they may know about. In this approach, very high speed detection of even complex networks is possible, without needing to perform brute-force queries to every system on the network. In addition, once the computer is known to the system, the user can optionally query the agent running on that system and dynamically query all of the information needed by the licensing system, for instance, on a periodic basis.

The license management application 108 also performs workflow and procedures for requesting license changes. The license management application 108 includes the ability to request changes to the configuration of licensed products, and then to submit and coordinate these changes with the vendor. At any time, the customer can request a change by making changes to the inventory, for example, shown in FIG. 2. Products can be added, deleted or moved across systems until the view shown reflects the configuration desired by the administrator. At that point, the administrator submits the annotated request to the vendor 110 using, for example, a TCP/IP (transport control protocol/internet protocol) network transaction based on the industry standard FTP (file transfer) protocol.

Once the vendor receives a request from a customer, a number of steps may take place. For instance, the request is authenticated and syntax checked to ensure completeness and accuracy. The configuration requested by the customer is compared to the configuration the customer is licensed for. Depending on the outcome, additional information may be required, for instance, if the customer is asking for more users than the customer is licensed for, or the request may be approved. Once the request is processed, a response is created that can be coupled to the original transaction submitted by the customer (user). The response is sent using, for example, an asynchronous messaging function, for instance, based on industry standard FTP protocols. When the customer receives the response, it is also validated and syntax checked. If the request resulted in changes to the customer's licenses, the customer can then communicate the updated licenses back to any agents 102 104 and servers 106, where the updated licenses are automatically populated into the configuration files on each computer 112 114, freeing the user from needing to perform this manual process.

The license management application 108 may also provide query, reporting and analysis tools. The information in the license management application 108 may be used for many purposes other than licensing. Asset management, financial analysis are some examples that can use this information. The license management application 108 includes an open-ended set of reporting and query tools that allow the administrator to access the information kept by the licensing system. In one embodiment, the communication among the agents and the license management system is TCP/IP based, and proper user credentials are used by the administrator to access a particular system. Different network transports may be utilized for communications among the components of the system of the present disclosure.

Figure 3:
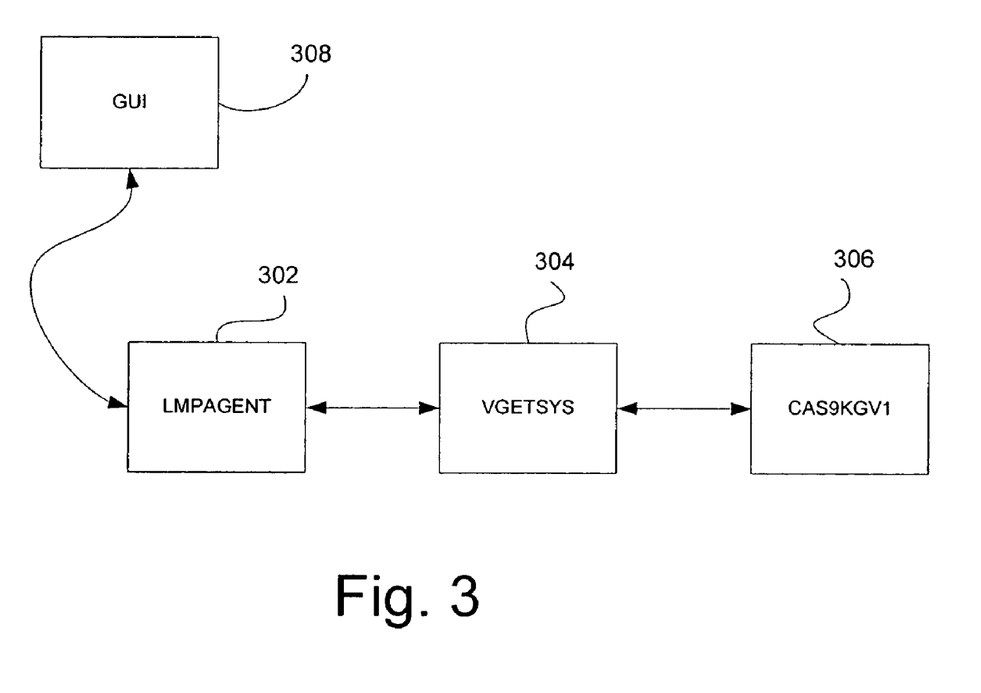
FIG. 3 is an architectural diagram illustrating the components of a license management agent in one embodiment.

FIG. 3 is an architectural diagram illustrating the components of the agent 102 in one embodiment. As described above, LMP license management agent handles license data gathering, for instance, from mainframe computers and distribution of the mainframe product information. The license data is gathered, for example, from a maintained license table, for instance, in core maintained LMP License Table that resides in CSA of the processor that is being addressed. Users may define and specify via the management application GUI (FIG. 1 108) the name of the mainframe computer that is to be contacted and from where information may be retrieved. The LMP license management agent analyzes the product information attained during the license data gathering. If from the analysis of the product information, it is determined that a product is reported as being in violation, no new license key for that product is generated. All other product keys have their keys regenerated, in one embodiment. The newly generated keys and their product names are registered in a table of products or the maintained license table and may ultimately become dataset replacement of the LMP Mainframe Dataset on the targeted mainframe. The LMP Mainframe Dataset, for instance, contains a list of the products and their associated keys. The user may update the dataset using the management application GUI. The backup of this dataset may be created.

Referring to FIG. 3, the LMP license management agent may include lmpagent 302 that processes all incoming requests, for example, from the GUI 308. This GUI 308, for instance, is the management application GUI (FIG. 1 108). lmpagent 302 is a module that may be programmed, for instance, in C programming language. The lmpagent 302 receives control upon dispatching and validates over-alterable parameter DEBUG and processes it. This can be specified as a startup parameter or as an environmental variable (LMPAGENT_DEBUG). In one embodiment, a default port number is used, however, the default may be over-ridden in the uses/etc. configuration by specifying a port number. The lmpagent 302 code then opens up a TCP/IP connection on the port attained and waits for incoming requests from the GUI 308. The lmpagent 302, for instance, gets the CPU configuration information from the system where the lmpagent 302 is running and returns that information to the caller, for example, the GUI 308. The lmpagent 302 also gets the product information as defined within the environment of the lmpagent 302.

A vgetsys 304 is a module that accesses the LMP CSA information and gathers the appropriate product information as the customer defined to CAIRIM. Vgetsys 304, in one embodiment, builds a plist and calls cas9kgv1 306 to generate the LMP platform specific key. Cas9kgv1 306 is a module that generates LMP keys using the supplied information passed to it by vgetsys 304. Vgetsys 304 may be written in assembler. New keys are generated when new license information is received from the vendor, via the management application GUI 308.

The LMP license management agent may include an authentication process or module that, for example, utilizes standard security access facilities to perform authentication checks. In one embodiment, the recorded product information is returned to the GUI 308, for example, information such as the CPU (type/model, serial) information and the newly generated license key, for example, LMP platform specific license key. This information is also be copied onto the LMP dataset. Backup of the LMP dataset may be created.

Figure 4:
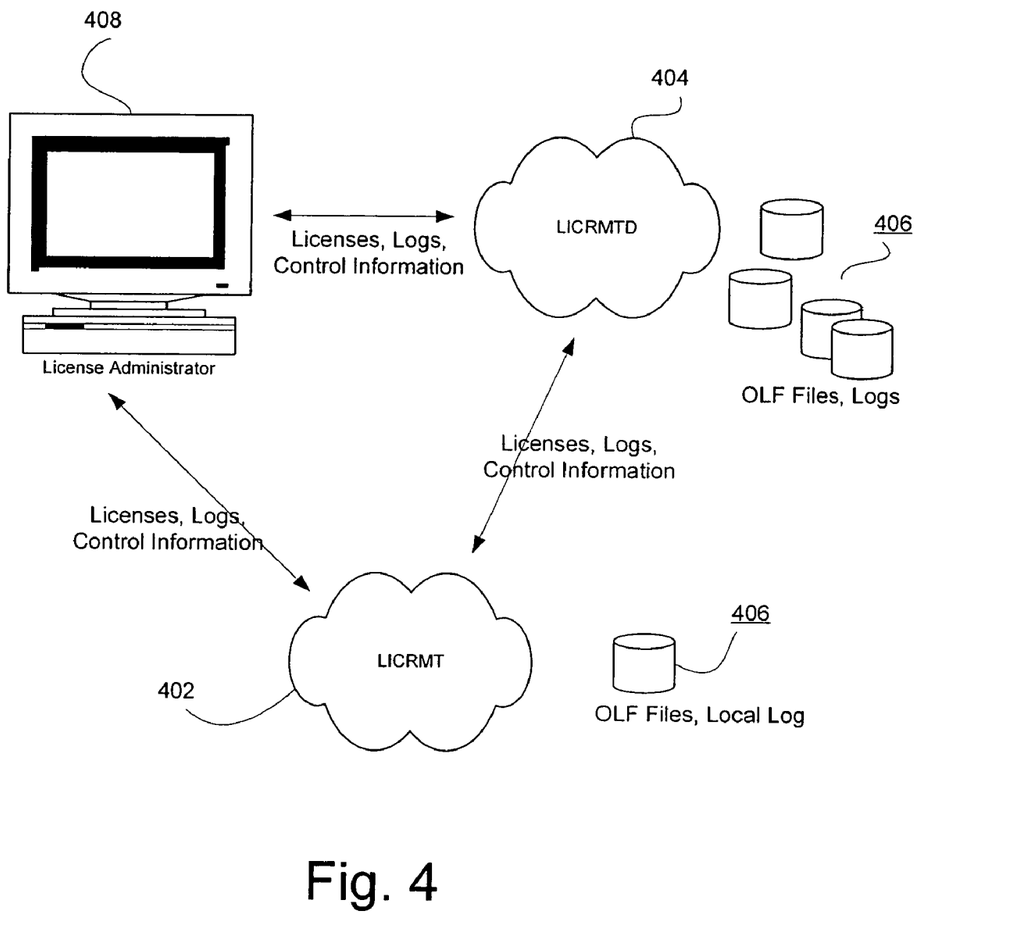
FIG. 4 is an architectural diagram illustrating the license management that includes an agent and a server approach.

In another embodiment, the license management agent may include an agent and a server, for instance, as referred to in FIG. 1 (104, 106). FIG. 4 is an architectural diagram illustrating the license management that includes an agent and a server approach. In this embodiment, the license management agent may include two processes, licrmt 402 and licrmtd 404. Licrmt 402 is a client-side license logging process and licrmtd 404 is a server-side of the license logging process. The licrmtd 404 handles consolidation of the information from multiple licrmt 402 agents, creating, for example, a file that contains licensing activity in an enterprise environment. The end-user computers, for instance, run the licrmt 402 client and the servers run the licrmtd 404 process.

The two process work in conjunction to read and update license files such as the OLF (omnibus license files), which is a text file containing product licenses and other control information. An OLF file may exist per computer that uses licensing. The two process may also access other information files such as lic98.data and lic98.net that may reside remotely, for example, to allow the license administration GUI 408 to distinguish between products available for use and those that actually are being used. The two processes may also retrieve configuration information such as the computer model, operating system version of the licensing system, etc. This information is used by the license administration GUI 408 to discover the configuration of remote systems. Requests, for example, originate from the license administration GUI 408, although there may also be requests between instances of agents. Most requests are directed to the licrmtd 404, which may be able to respond to the request without needing to go the target machines (for instance, licrmt 402). For those requests that need responses from the target machines, licrmtd 404 and licrmt 402 synchronize with one another, for example, using a combination push/pull model. This permits the type of network where individual computers do not necessarily run licrmt 402 all the time on each computer.

Licrmt 402 client, for instance, transmits license activity to one or more centralized licrmtd 404 servers. Licrmt 402 also may respond to a variety of new requests that originate from the license administrator GUI 408. Licrmt 402 need not be continuously running, and when Licrmt 402 is running, it may periodically communicate with an adjacent licrmtd server 404.

For instance, during startup licrmt 402 finds a usable copy of licrmtd 404 to communicate with. This can be a configuration option or a discovery by sending a broadcast IP datagram on the local subnet. Licrmt 402 need not communicate with a single copy of licrmtd 404. For example, a different server can be used on a transaction by transaction basis.

Once Licrmt 402 knows which copy of licrmtd 404 to communicate with, it may issue periodic requests to get an updated OLF file from the server. This way, new requests for a particular target system can be stored on the licrmtd 404 server and sent to individual target nodes as they are requested. For example, licrmt 402 may transmit a "get_olf" message to licrmtd 404. This message may contain hostname of the licrmt client, CPU model information such as Linux_s390_1_*, and current site identifier (ID) and other identification information stored in the current OLF file. If updates are needed for the target system (for instance, the one running the licrmt 402), licrmtd 404 responds with an OLF file 406 that is appropriate for the client system (for example, the one running the licrmt 402), based on global defaults, host name or model information. Licrmtd 404 updates the information from the client system (licrmt 402) in the OLF files, for instance, new keys or entries are added and modified keys are updated. Original or previous OLF files may be retained under a different name or extension. In another embodiment, the original OLF files may be replaced rather than merged with newer information.

Licrmtd 404 is the server side of the remote logging function. It accepts information transmitted by licrmt 402 and creates an enterprise-side file, for instance lic98.net file, that acts as an audit trail of license activity. Licrmtd 404, in one embodiment, acts as a server to both the license administration GUIs 408 and to any licrmt 402 clients requesting its services. One licrmtd may service a plurality of systems (for example, GUIs 408 and licrmts 402) concurrently, and accordingly, may be implemented under a threading model, a large process, or a number of new processes for each incoming concurrent request.

Licrmtd 404, in one embodiment, serves OLF files to individual licrmt 402 agents. Licrmtd 404 may store different OLF files according to site identifiers, host name, and CPU model information. A file and directory naming scheme may be used. For instance, when first started, licrmtd 404 may create a new directory, OLF. Within this directory may be files such DEFAULT.OLF (a system global default which is given to licrmt agents not matching a further criteria), Site_id (another directory, for instance, one per site name), Site_id/DEFAULT.OLF (a default OLF for a particular site), Site_id/hostname.OLF (an OLF for a particular host at a site), Site_id/model.OLF (an OLF for a specific CPU model within a site).

In one embodiment, when licrmtd 404 returns an OLF to a client, it follows a search order when deciding which file to return. The search order goes from specific (best-fitting) to generic, and ends when the first file is found following this sequence: file of the format ./OLF/site_id/hostname.olf (where site_id is the client's site identifier and hostname is the client's host name; file of the format ./OLF/site_id/model.olf (where site_id is the client's site identifier and model is the client's CPU model); file of the format ./OLF/site_id/default.olf (where site_id is the client's site identifier); file of the format ./OLF/default.olf. These directories are created in response to commands from the license administrator GUI 408 to store new OLF files.

In one embodiment, licrmtd 404 also may periodically discover other instances of itself in the network. This information is used, for instance, by the license administrator GUI 408 to draw an enterprise-wide view of all computer systems. This licrmtd 404 discovery function may use Internet Control Message Protocol(ICMP) Routing Information Protocol (RIP) messages to discover adjacent subnets and then discover adjacent copies of licrmtd.

In one embodiment, the transactions described above occur in a messaging based on ASCII text strings being exchanged between a client and a server. The messages are transmitted as a sequence of valid ASCII characters, for instance, terminating with a constant, "<EOM>". Messages may be further divided into two categories: requests and responses. Request messages are generally in the format: "Command Argument(s) . . . <EOM>". Responses are generally in one of the following forms: "ERROR message <EOM>" for standard form of an error message; "<*OK> response <EOM>" for standard from of an acceptable result. The response field of the standard form of an acceptable result may be empty.

Examples of network messages include "administrator sign-on," "retrieve OLF file contents," "retrieve configuration data," "retrieve log information," "update OLF file," "update or empty log files." For administrator sign-on, because the agent can access and update sensitive information, it asks that the end-user supply a valid user identifier (id) and password before attempting any of the other messages. On platforms that readily support user id and password entry, those facilities may be used, or a "password" can be configured into the agent code and used directly. The format of the administrator sign-on message may be "SIGNON type username password" where type can be, client, server, or admin, and allows the software to distinguish between different client types automatically, for instance, a client sign-on may not always require security, but an administrator attempting to read or update licenses may. On platforms that support an operating system mechanism for authenticating users, the user and password may be validated against it. Platforms which do not support this type of service can be configured to use a local password file with a format such as "type username password," where type can be client, server, or admin. The username and password fields can be optional, and in this case, no user or password need be entered for a type of a user providing an "anonymous" sign-on capability.

The response to the SIGNON message may be an empty "OK" message if the user name and password are acceptable, or an ERROR message showing the text of an error message that can be displayed for the user. When a connection is no longer needed, it may be possible to send a specific request to terminate a connection. Optionally, the server can close the socket connection. This message may be an "EXIT" message.

For retrieving OLF file contents, licrmt 402, licrmtd 404, and the license administrator GUI 408 may need to read a remote OLF license file. Depending on why the file is being read, this may be reading either a specific OLF file, or a generic one, that is, the one that is appropriate for a specific site, hostname or CPU model. If a generic OLF file is needed, then an application may start by sending a query that asks the server what OLF file it can use. This query may use a network message in the form of "QUERYOLF hostname model site," where hostname is the name of the host desired, model is the CPU model string for that host, and site is site identification data. The response information may be either an ERROR message explaining that there are no matching OLF files for the information provided, or an OK message showing the specific file name that applies for the given query.

The network message requesting a specific OLF file may be "GETOLF filname," where filename is an OLF file to be read, which can be the default name or another name if known. The response information from GETOLF may be an error message or the text of the named OLF file, formatted for example as: "<*OK*> olf lines <EOM>," where OLF lines are returned exactly as they are read from the OLF file.

The servers include the ability to retrieve configuration data. The network message format for this function may be "GETCONFIG." Response information may be an error message explaining why the operation failed, or the following type of information: server—type of server (licrmt or licrmtd); version—software version and release; machine—machine type; OS—host operating system name, version; hardware—hardware type/signature (MAC address, disk serial, etc); network—IP address, domain and subnet information; locale—default code page; ident—client identification (may be a structure); connects—list of connected systems; olfinfo—size, timestamp, and CRC of current OLF info; datainfo—size, timestamp, and CRC of current data file; netinfo—size, timestamp, and CRC of current network file. This information is provided by the agents.

The "connects" information lists the names and types of all systems that the target knows about. For licrmt 402, this may be the list of licrmtd 404 servers it is configured to talk to. For licrmtd 404, this may be the list of licrmt 402 clients that have sent data to it, as well as the list of other licrmtd servers that have been discovered by this copy of licrmtd 404.

Periodically, the license administrator GUI 408 may need to access the license audit trail on both licrmt and licrmtd servers. The network message "GETLOG type" may be used to provide this capability, where type may be LOCAL (which may result in the lic98.data file being read) or REMOTE (which may result in the lic98.net file being read). Response information may be an error message explaining why the file cannot be read or other log information. The format of the response may be "<*OK*> report lines (CSV style) <EOM>."

When an end-user changes licensed product configuration, an updated OLF file may be stored in one or more locations. A "NEWOLF filename" message may be used to ship new OLF file content. Further, a "MERGEOLF filename" message may be used to merge the content of previous OLF files with updated entries. Filename in both messages is the name of the OLF file to be updated. The application sending the new or updated OLF file may then transmit the contents of the OLF file, followed by an end of message marker (<EOM>).

The receiving server, in one embodiment, properly handles the new OLF file, depending on its contents and the type of server that is being communicated with. For example, an OLF file sent to licrmt 402 may be merged with or replaced with the OLF file at the given filename, while an OLF file sent to licrmtd 404 may be parsed and stored in the OLF directory structure.

The license administrator GUI 408 may periodically retrieve and process log files 406 from one or more clients, and further may reset or otherwise update the log file on the target system (420 404). To clear a log file on the remote system, message "CLEARLOG type" may be used, where type may be LOCAL or REMOTE. To update a remote log file, a "NEWLOG type" transaction may be used, followed by the data for the log file being updated. The data transmitted may completely replace the existing file in one aspect. Alternatively, if type WRITE is used with the transaction, a merge of the information in the old file may occur.

In one embodiment, license updates are triggered by the client placing orders with a company for new products, or by configuration changes in his environment.

In one embodiment, the agent-server approach shown in FIG. 4 may include a lic_agent_main module that is a main entry point for the functions performed. The lic_agent_main receives control after licrmt/licrmtd accept a network connection from a client system. The caller (licrmt/licrmtd) sets up a thread per concurrent connection, for example, and lic_agent_main is passed a socket connection and an indication of who the caller is (licrmt or licrmtd). Lic_agent_main loops through the following steps: assemble a complete message from the caller, which may involve multiple TCP/IP receives; parse the message; invoke a function based on the type of messaged received; return appropriate response to the client; loop until the connection is closed, at which point control returns to the caller.

The functions invoked may include lic_agent_signon, which handles SIGNON message and interfaces to user authentication system; lic_agent_exit, which handles EXIT message and closes connection and returns; lic_agent_getolf, which handles GETOLF transaction to retrieve the contents of a particular OLF file; lic_agent_queryolf, which handles QUERYOLF message to return appropriate OLF filename for a given host, site ID and CPU model; lic_agent_qetconfig, which handles GETCONFIG message to return configuration of the local system; lic_agent_getlog, which handles GETLOG message to return local or network log messages to the caller; lic_agent_mergeolf, which handles MERGEOLF message to accept OLF file updates and merge them into the current system's OLF file; lic_agent_newolf, which handles NEWOLF message to replace the existing OLF file with one passed by the client; lic_agent_clearlog, which handles CLEARLOG message to empty the local or network log files; lic_agent_newlog, which handles NEWLOG message to accept a new local or network log file and replace the corresponding existing log file with this information. Lic_agent_newlog may also be the entry point for existing log records.

Licrmt 402, in one embodiment, connects to a licrmtd 404 server, or uses a datagram connection, scans the license data file residing on the system, looking for updates, and formats updates and forwards them to one or more licrmtd 404 servers. Licrmt 402 may periodcially check for new license files by sending a QUERYOLF and GETOLF sequence to one or more licrmtd 404 servers. Licrmt 402 may also act as a peer licrmtd for a number of selected functions such as GETCONFIG. To accomplish this, a serve socket may be opened and threads managed. In one embodiment, code of computer instructions providing licrmt 402 and licrmtd 404 may be merged into a common executable.

Licrmt 402 may further open a server side socket and wait for connections from peers. Each time a connection is received, a new thread may be created and the lic_agent_main function may be driven with the client's socket. If the licrmt 402 determines that OLF updates are pending, for example, from sending a QUERYOLF/GETOLF messages, the corresponding OLF file is retrieved and merged into the current one. This allows OLF updates to be broadcasted throughout the environment.

Licrmtd 404 is a server side complement to licrmt in one embodiment. In one embodiment, it is used as a server that consolidates the messages coming form licrmt, allowing a central, enterprise-wide activity log to be maintained. Licrmtd 404 maintains a server socket that accepts connections from licrmt. Licrmtd 404 also supports IP datagram for this capability. Licrmtd 404 parses incoming messages and updates the license data file for the network with the results of the parsed messages.

In one embodiment, licrmtd 404 may act as a peer to licrmt and the license administrator GUI. Licrmtd 404 may create a new thread per connection and drive the lic_agent_main function for each connection. Licrmtd 404 also includes the capability to handle the directory structured OLF files, which enables licrmtd to become a staging area for multiple OLF files according to the site ID, hostname or CPU model of the peer. Licrmtd 404 is also enabled to dynamically discover all other copies of itself. Various routing protocols (RIPs) that allow applications to broadcast and query across subnet boundaries may be used for such discovery.

The management application (FIG. 1 108), for example, the license administrator GUI, communicates with the agents (and/or servers) and also with a company providing the products available for licensing. Thus, for example, the management application may send current system configuration to the company or receive new licensing information from the company. Further, the management application distributes new licenses to the agents throughout the site.

The management application includes a GUI that presents clients with an easy graphical way of seeing exactly what products are licensed on what systems. The GUI also allows the clients to customize their licensing requirements on different systems. The GUI may include a plurality of screens that allow a user to enter data fields and view various information about the licensed products on the systems that are known to the license management agents and servers. Communications between the GUI and the agents may be accomplished via TCP/IP.

The system and method of the present disclosure, in one embodiment, provides agents that can interact with the underlying software licensing system, servers that consolidate information from multiple agents into a single management entity, a management application that allows the administrator to interact with the system, and back-end business processes and the related business processes that provide for license generation and administration. In another embodiment, the licenses may be enforced in such a way that the decision making occurs over a network, for example, on the supplier's computer.

The system and method of the present disclosure may be implemented and run on a general-purpose computer. The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for distributing software licenses in a networked computing environment, comprising:
   an agent residing on a computer in a network, the agent operable to gather configuration information about the computer on which the agent resides and one or more products installed on the computer; and
   a management application in the networked computing environment, the management application in communication with the agent and operable to:
      receive the configuration information from the agent;
      use the configuration information to identify a particular product installed on the computer of which use by the computer is not allowed by a valid license agreement;
      in response to the identification of the particular product of which use is not allowed by a valid license agreement, automatically communicate with a vendor computer of the particular product to request a new license from the vendor; and
      provide information associated with the new license to the agent when received from the vendor computer.

2. The system of claim 1, wherein the agent is further operable to:
   update license information on the computer on which the agent resides in response to receiving the information associated with the new license from the management application; and
   generate a new key for the updated license information.

3. The system of claim 1, wherein the management application includes a graphical user interface.

4. The system of claim 1, wherein the new license comprises a new license for a newly installed product.

5. The system of claim 1, wherein the new license comprises an updated license for an updated product.

6. The system of claim 1, wherein one or more reports are generated using the configuration information.

7. A system for distributing software licenses in a networked computing environment, comprising:
- a client agent residing on a computer in a network, the agent operable to gather configuration information about the computer on which the client agent resides and one or more products installed on the computer;
- a server agent operable to communicate with the client agent, the server agent further operable to maintain the configuration information received from the client agent in a central network location; and
- a management application in the networked computing environment, the management application in communication with the server agent and operable to:
  - receive the configuration information from the server agent;
  - use the configuration information to identify a particular product installed on the computer of which use by the computer is not allowed by a valid license agreement;
  - in response to the identification of the particular product of which use is not allowed by a valid license agreement, automatically communicate with a vendor of the particular product to request a new license from the vendor; and
  - provide information associated with the new license to the server agent, when received from the vendor computer, for communication of the information to the client agent.

8. The system of claim 7, wherein the server agent operable to update the configuration information in the central network location with information from the new license.

9. The system of claim 7, wherein the client agent is operable to periodically and automatically push the configuration information to the server agent.

10. The system of claim 9, wherein the server agent synchronizes the configuration information pushed from the client agent with the configuration information stored in the central network location.

11. The system of claim 10, wherein the server agent responds to the request from the management application regarding configuration information about the client agent using the configuration information stored in the central network location.

12. The system of claim 7, wherein the client agent needs not run continuously.

13. The system of claim 7, wherein the management application provides one or more reports about the computers in the network based on the configuration information stored in the central network location.

14. A method of distributing software licenses in a networked computing environment, comprising:
- using an agent installed on a computer in a network to retrieve configuration information about the computer and one or more products installed on the respective computer;
- communicating the configuration information to a management application installed on a network device within a networked computing environment, the network device being remote from the agent;
- using the configuration information to identify a particular product installed on the computer of which use by the computer is not allowed by a valid license agreement; and
- in response to the identification of the particular product of which use is not allowed by a valid license agreement, automatically communicating with a vendor computer of the particular product to request a new license from the vendor.

15. The method of claim 14, wherein the method further includes enabling the management application to communicate with a vendor computer to receive information associated with the new license for the one or more products installed on the computer where the agent resides when received from the vendor computer.

16. The method of claim 14, further including:
- producing one or more reports using the configuration information.

17. A method of distributing software licenses in a networked computing environment, comprising:
- providing a management application including a user interface on a network device within a networked computing environment;
- using a client agent installed on a computer remote to the network device on which the management application is provided to retrieve configuration information about the computer on which the client agent resides;
- communicating the configuration information to a server agent operable to receive and store the configuration information in a central network location;
- using the server agent to identify, from the configuration information, a particular product of which use by the computer is not allowed by a valid license; and
- in response to the identification of the particular product of which use is not allowed by a valid license agreement, automatically communicating with a vendor computer of the particular product to request a new license from the vendor.

18. The method of claim 17, further including pushing the configuration information periodically and automatically from client agent to the server agent.

19. Logic for formatting and indexing data, the logic encoded in computer readable media and operable when executed by a computer to:
- use an agent installed on a computer in a network to retrieve configuration information about the computer on which the agent resides and one or more products installed on the computer;
- communicate the configuration information to a management application installed on a network device within a networked computing environment, the network device being remote from the agent;
- use the configuration information from the agent to identify a particular product installed on the computer of which use by the computer is not allowed by a valid license agreement; and
- in response to the identification of the particular product of which use is not allowed by a valid license agreement, automatically communicate with a vendor computer associated with the particular product to request a new license from the vendor.

20. Logic for formatting and indexing data, the logic encoded in computer readable media and operable when executed by a computer to:

provide a management application including a user interface on a network device within a networked computing environment;

use a client agent installed on a computer remote to the network device on which the management application is provided to retrieve configuration information associated with the computer on which the client agent resides and one or more products installed on the computer;

communicate the configuration information to a server agent operable to receive and store the configuration information in a central network location;

use the server agent to identify, from the configuration information, a particular product installed on the computer of which use by the computer is not allowed by a valid license agreement; and in response to the identification of the particular product of which use is not allowed by a valid license agreement, automatically communicate with a vendor of the particular product to request a new license from the vendor.

* * * * *